F. S. BLACKMARR.
STUMP PULLER AND STACKER.
APPLICATION FILED MAR. 8, 1917.
1,280,951.
Patented Oct. 8, 1918.
2 SHEETS—SHEET 2.
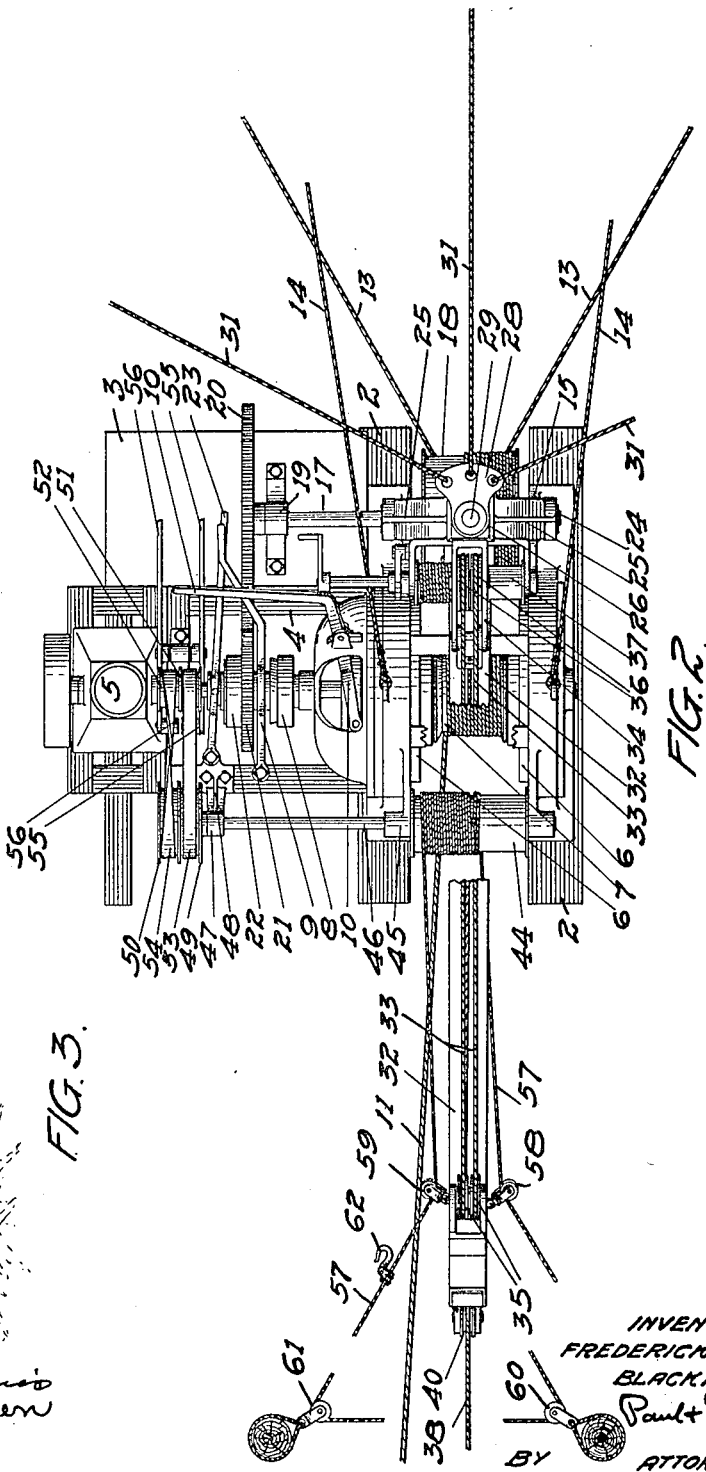
WITNESSES
INVENTOR
FREDERICK S.
BLACKMARR
Paul+Paul
BY ATTORNEYS

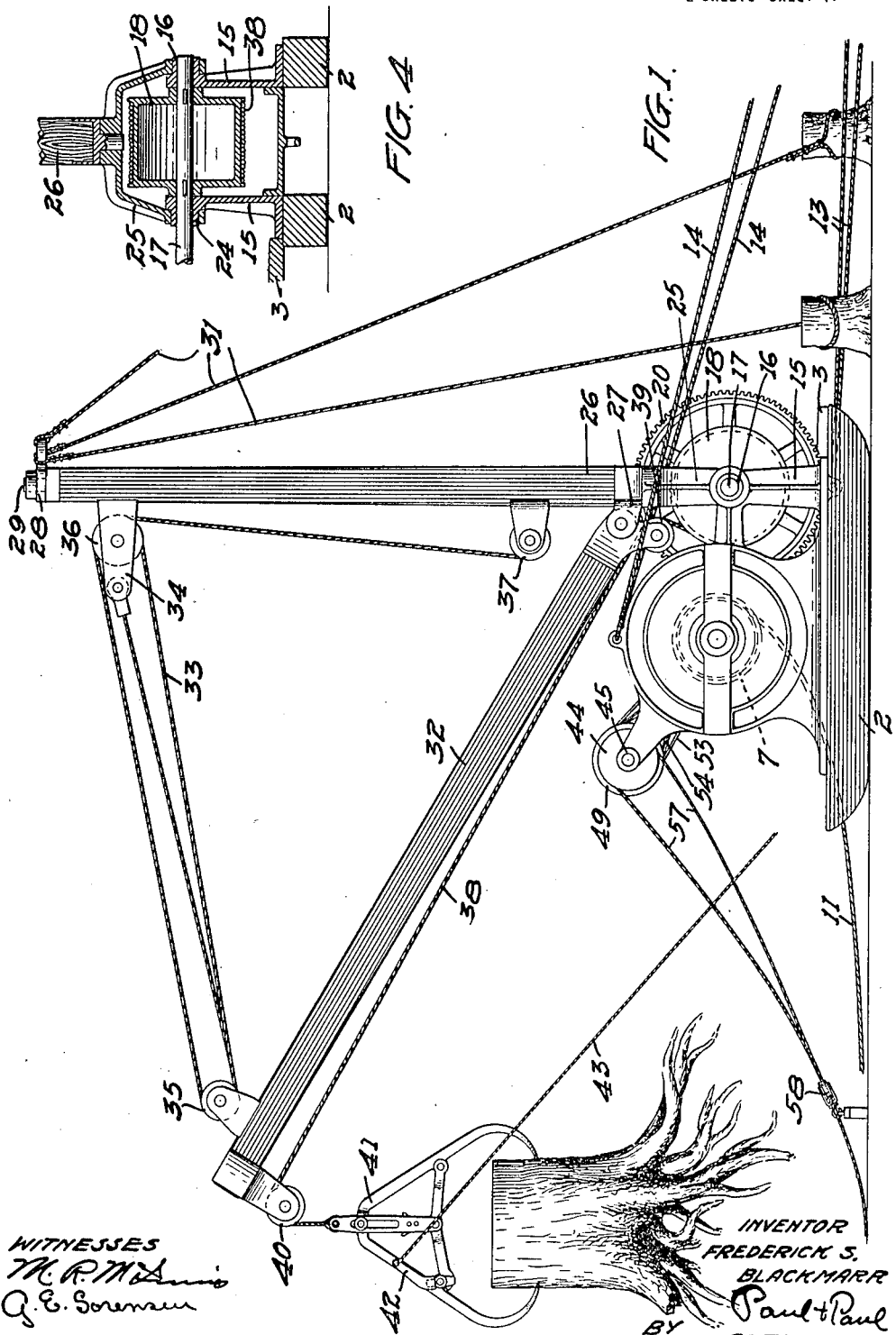

UNITED STATES PATENT OFFICE.

FREDERICK S. BLACKMARR, OF BAYFIELD, WISCONSIN, ASSIGNOR TO BLACKMARR MACHINE COMPANY, OF BAYFIELD, WISCONSIN, A CORPORATION OF WISCONSIN.

STUMP PULLER AND STACKER.

1,280,951.      Specification of Letters Patent.      Patented Oct. 8, 1918.

Application filed March 8, 1917. Serial No. 153,397.

*To all whom it may concern:*

Be it known that I, FREDERICK S. BLACKMARR, a citizen of the United States, and resident of Bayfield, county of Bayfield, State of Wisconsin, have invented certain new and useful Improvements in Stump Pullers and Stackers, of which the following is a specification.

This invention relates to improvements in devices designed for pulling stumps and stacking them in piles in order that they may be readily burned.

The invention consists generally in the constructions and combinations hereinafter described and particularly pointed out in the claims.

In the accompanying drawings forming part of this specification,

Figure 1 is a side elevation of a mechanism embodying my invention,

Fig. 2 is a plan view of the same,

Fig. 3 is a detail showing the manner in which the pulling cable is applied to a stump for the purpose of pulling it out of the ground, Fig. 4 is a detail showing the connection between the mast and the supporting yoke.

In the drawings, 2 represents the base of the machine preferably composed of longitudinally extending runners or timbers having the ends cut away on upward curves so as to permit said base and the mechanism carried thereby to be readily drawn along the ground and moved from one place to another. As here shown there are two main timbers on which the drums and mast are secured and a parallel side timber which with one of the main timber supports a suitable platform 3 and cross timbers 4 which form a base for a suitable engine or motor 5. This platform also forms a support for certain parts of the gearing as hereinafter described. Mounted preferably in upright position within side plates 6, 6, is a pulling drum 7. This drum is preferably driven directly from the engine shaft through suitable reduction gearing by means of which the drum is rotated slowly while the power exerted by the engine through said drum, in the pulling operation, is multiplied many times. A suitable clutch 8 is provided under control of a lever 9 by which the engine shaft may be coupled directly to the drum shaft. A suitable lever 10 is also provided by means of which the gearing of the drum may be disconnected so as to permit the drum 7 to be rotated freely in either direction. A cable 11 is wound upon the drum and the end of this cable may be attached to the stump to be pulled out of the ground in any suitable manner. I prefer to provide a chain 12 that is passed around the stump and over the top thereof and has its end connected to the end of the cable, as illustrated in Fig. 3 of the drawings.

I make no claim in this application to the construction of the pulling drum or the means connecting the same with the engine, as I have shown, described and claimed the drum and its engine connection in an application for patent entitled "Differentially-geared drums" filed of even date herewith.

In using the apparatus for pulling stumps the base of the machine is firmly anchored by suitable cables 13 connected to the rear end of the base and fastened to suitable stumps, trees or other suitable anchoring devices. I also prefer to provide additional holding cables 14 having their ends connected to the top of the drum frame, these cables being also fastened to suitable anchoring means.

After the stumps are pulled out of the ground it is desirable to draw them together and stack them in suitable piles for burning. For this purpose I provide an auxiliary frame mounted upon the rear of the base 2. This frame is preferably formed of metal and it may be made integrally with the frame of the pulling drum. It is here shown provided with upright standards 15 having bearings 16 for the shaft 17 of a suitable hoisting drum 18. The shaft 17 of this drum extends a considerable distance over the platform 3 and is supported at its ends in a bearing in a suitable standard 19 secured upon said platform. The shaft 17 is provided with a large gear 20 which is in mesh with the smaller gear 21 mounted directly upon the engine shaft and adapted to be connected thereto by a suitable clutch 22' having an operating lever 23. By connecting the gear 21 with the engine shaft through the clutch 22' I am enabled to drive the large gear 20, the shaft 17 and the drum 18 at any desired speed.

The standards 15 are preferably provided with outwardly projecting trunnions 24 through which the shaft 17 passes. A yoke 25 is mounted upon these trunnions and is free to swing thereon, its movement being limited only by the base upon which the machine is supported in one direction and by the frame of the pulling drum in the other direction. The cross bar of the yoke is provided with an opening forming a step bearing which receives and holds the step of the mast.

The upper end of the mast is preferably provided with a plate 28 connected to the top of the mast by a stud 29. The plate 28 projects beyond the top of the mast and is provided with openings or eyes to which the stay-ropes or cables 31 are attached. The opposite ends of these cables are fastened to stumps, trees or other anchoring means. A boom 32 is hinged at its lower end upon a casting 27 at the foot of the mast. This boom extends in an inclined direction from the mast and its position is regulated in the usual way by a cable 33 having one end attached to a bracket 34, near the top of the mast, said cable being passed back and forth over pulleys 35 and 36 and having its free end connected to a windlass 37 near the lower end of the mast. The hoisting cable 38 passes from the drum 18 over a sheave 39 at the lower end of the boom and passing also over a sheave 40 at the upper end of the boom. The end of the cable is provided with suitable lifting hooks 41 by means of which a stump may be grasped, hauled inwardly and hoisted onto a pile or stack at any convenient point near the machine. In clearing land it is desirable to pile the stumps into stacks of convenient size for burning. The lifting hooks are provided with a suitable trip 42 to which a cord 43 may be connected. By pulling upon this cord the trip is operated and the stump is released from the lifting hooks. The ends of the lifting hooks are provided with suitable jaws for grasping the stumps.

I do not in this application claim the construction of the lifting hooks herein illustrated, as the same are fully illustrated, described and claimed in an application filed by me of even date herewith entitled "Improvements in lifting hooks." I, therefore, deem it unnecessary to illustrate or describe in detail in this application the construction and mode of operation of said hooks.

I also prefer to provide a small drum 44 preferably mounted in bearings 45 supported upon the frame of the pulling drum and having a shaft 46 with its end supported in a bearing 47 formed in a standard 48 carried upon one of the cross timbers 4. The shaft 46 is provided with a pair of flange pulleys 49 and 50. The engine shaft is also provided with flange pulleys 51 and 52. Straight and cross belts 53 and 54 connect the pulleys 49 and 50 on the shaft 46 with the pulleys 51 and 52 on the engine shaft. Suitable belt tighteners 55 and 56 are provided for the belts 53 and 54. Ordinarily these belts stand still and pulleys 51 and 52 run loosely in them and do not rotate the shaft 46 and drum 44. When either of the belt tighteners is operated the corresponding belt is tightened and the shaft 46 and drum 44 are rotated. These parts may be rotated in either direction by tightening one or the other of said belts.

An endless cable 57 is wound in opposite direction upon the drum 44 and extends preferably through guide pulleys 58, 59, 60 and 61. These pulleys are attached by suitable means to any suitable supports that may be convenient, such as trees or stumps. The cable 57 which I designate a "pull back" cable is preferably provided with a suitable grab hook 62, which may be fastened to it in any convenient manner. The cable 57 is preferably of considerable length and it may be carried to any convenient point near or beyond the place where the stumps operated upon are located.

When a stump has been brought in by the stacking cable and placed on the pile, the end of the stacking cable may be connected to the hook 62. One of the belts being tightened the drum 44 will be rotated and the end of the stacking cable will be carried out by the movement of the "pull back" cable 57 to, or near to, the point where the lifting hooks are to be affixed to another stump.

One of the special advantages obtained from my construction and arrangement of parts is derived from the location of the mast on the yoke directly over the shaft 17 of the stacking drum 18. This brings the weight of the mast and boom and the load carried thereby directly onto the standards 15 and the point where the anchoring cables 13 are attached. The entire weight of these parts being upon this portion of the base assists in holding the device in place during the pulling and stacking operation. It will be understood that the pulling and stacking operations may be carried on simultaneously, both the pulling and stacking drums being operated from the same engine. It will also be understood that the mast and boom are capable of turning in either direction being limited only in their movement by the position of the cables 31. It will also be understood that these cables may be extended either forward or back or to either side of the apparatus without interfering with the operation of any of the mechanism.

The mounting of the boom in the swinging yoke 25 enables the mast and boom to be quickly and easily erected. When these parts are to be assembled the yoke is turned down to a substantially horizontal position and the step of the mast is inserted into the opening in the yoke. The end of the stacking cable, or the end of the pulling cable, preferably the former, is carried forward and up over the drum 44. It is then carried back and attached to the boom, which will have been drawn up against the mast, and the boom and mast are then pulled by this cable into a vertical position. The cables 31 are then fastened to suitable anchorages, the boom lowered and the device is ready for operation.

I claim as my invention:

1. In a stump puller and stacker, the combination with a suitable base, of a hoisting drum mounted in suitable standards on said base, a yoke extending above said hoisting drum and provided with a step bearing, a mast having a step mounted in the bearing in said yoke, a boom pivotally connected to the lower end of said mast, and a cable upon the hoisting drum passing over sheaves upon said boom.

2. In a stump puller and stacker, the combination with a suitable base, of a hoisting drum mounted in suitable standards on said base, a platform secured to said base at one side thereof, a suitable motor mounted upon said platform, means for driving said drum from said motor, a yoke extending above said hoisting drum and provided with a step bearing, a mast having a step mounted in the bearing in said yoke, a boom pivotally connected to the lower end of said mast and a cable upon the hoisting drum passing over sheaves upon said boom.

3. In a stump puller and stacker, the combination with a suitable base, of a hoisting drum mounted in suitable standards on said base, means for rotating said drum, a yoke extending above said hoisting drum and provided with a step bearing, a mast having a step mounted in the bearing in said yoke, means for holding said mast in an upright position, a boom pivotally connected to the lower portion of said mast above said yoke, and a cable upon the hoisting drum passing over sheaves upon said boom.

4. In a stump puller and stacker, the combination with a base, of a hoisting drum mounted on said base, a yoke extending above said hoisting drum, a mast mounted in said yoke, a boom pivotally connected to said mast, a cable arranged upon said hoisting drum and passing over sheaves on said boom, a drum mounted in bearings upon the frame of said machine, means for rotating said last named drum in either direction, an endless cable wound in opposite directions upon said last named drum, means arranged at a distance from said base for supporting the outer portion of said endless cable, and means upon said endless cable adapted to engage the end of the hoisting cable, and draw said hoisting cable out to any desired point for attachment to its load.

5. In a stump puller and stacker, the combination with a suitable base, of a hoisting drum mounted upon said base, a mast mounted upon said base, a boom pivotally connected to said mast, a cable arranged upon said hoisting drum and passing over sheaves on said boom, a drum provided with means for rotating it in either direction, an endless cable wound in opposite directions upon said last named drum, means arranged at a distance from said base for supporting the outer portion of said endless cable, and means upon said endless cable adapted to engage the end of the hoisting cable and draw said cable out to any desired point for attachment to its load.

6. In a stump puller and stacker, the combination, with a suitable base having standards thereon, of a hoisting drum mounted in standards, a yoke pivotally mounted upon the shaft of said hoisting drum and adapted to swing from a vertical to a horizontal position, said yoke being provided in the cross bar thereof with a step bearing, a mast having a step adapted to be inserted into said bearing, a boom pivotally supported upon said mast, whereby the yoke may be swung into a horizontal position, the step of the mast inserted in the bearing in the yoke, and the yoke, boom and mast, be then swung into an upright position, means for holding the mast in an upright position, and a cable upon said hoisting drum extending over sheaves upon said boom.

7. In a stump puller and stacker, the combination with a suitable base having standards thereon, of a hoisting drum mounted in said standards and provided with a hoisting cable, a yoke pivotally mounted upon the shaft of said hoisting drum and adapted to swing from a vertical to a horizontal position, said yoke being provided in the cross bar thereof with a step bearing, a mast having a step adapted to be inserted in said bearing, a boom pivotally supported upon said mast, and an independent drum in front of said hoisting drum, whereby said yoke may be swung into a horizontal position, the step of the mast inserted in the bearing in the yoke, the hoisting cable passed under and then over said independent drum and attached to said boom and mast, and the yoke, boom and mast be raised by said hoisting cable into an upright position, and means for holding the mast in such upright position.

In witness whereof, I have hereunto set my hand this 5th day of December 1914.

FREDERICK S. BLACKMARR.

Witnesses:
GENEVIEVE E. SORENSEN,
EDWARD A. PAUL.

Copies of this patent may be obtained for five cents each, by addressing the "Commissioner of Patents, Washington, D. C."